United States Patent [19]

Fry

[11] Patent Number: 4,553,977
[45] Date of Patent: Nov. 19, 1985

[54] SOLID WASTE PROCESSING

[76] Inventor: Thomas H. Fry, 10440 Tuxford, Sun Valley, Calif. 91352

[21] Appl. No.: 594,567

[22] Filed: Apr. 19, 1984

[51] Int. Cl.$^4$ .............................................. B03B 7/00
[52] U.S. Cl. ...................................... 44/1 D; 209/38; 209/930; 209/631
[58] Field of Search ................ 44/1 D, 10 A; 209/38, 209/636, 702, 930, 12, 44.1, 629, 631, 634

[56] References Cited

U.S. PATENT DOCUMENTS

| Re. 29,156 | 3/1977 | Marsh | 44/1 D |
|---|---|---|---|
| 3,595,389 | 7/1971 | Morgan | 209/930 X |
| 3,650,396 | 3/1972 | Gillespie et al. | 209/3 |
| 3,672,496 | 6/1972 | Williams | 209/38 |
| 3,687,062 | 8/1972 | Frank | 209/38 X |
| 3,749,240 | 7/1973 | Spears et al. | 209/631 |
| 3,757,946 | 9/1973 | Berkowitz et al. | 209/631 X |
| 3,779,379 | 12/1973 | Buchbinder et al. | 209/102 |
| 3,804,248 | 4/1974 | Talamantz | 209/125 |
| 3,809,239 | 5/1974 | Barrett et al. | 209/111.8 |
| 3,973,736 | 8/1976 | Nilsson | 209/12 X |
| 4,069,145 | 1/1978 | Sommer, Jr. et al. | 209/212 |
| 4,095,956 | 6/1978 | Holmes | 44/1 D X |
| 4,194,968 | 3/1980 | Pfalzer et al. | 209/38 X |
| 4,257,511 | 3/1981 | Miller | 209/631 |
| 4,373,435 | 2/1983 | Grevich | 100/49 |
| 4,387,019 | 6/1983 | Dale et al. | 209/38 X |
| 4,480,737 | 11/1984 | Jamgochian et al. | 209/631 X |

Primary Examiner—D. E. Gantz
Assistant Examiner—Glenn A. Caldarola
Attorney, Agent, or Firm—Christie, Parker & Hale

[57] ABSTRACT

Solid waste is separated by a first trommel screen into substantially intact aluminum cans and an organics-rich fraction from which recyclable fiber products may be separated. Organics are at least in part isolated for use as a fuel with or without pulping. The aluminum cans are separated from inorganics in a second trommel screen and, by manual sorting, organic combustibles are separated from the aluminum cans. Magnetic separation is used as required to recover ferrous materials. The recyclable fiber products may be processed for conversion to paper pulp and residue for use as a fuel.

17 Claims, 2 Drawing Figures

SOLID WASTE PROCESSING

BACKGROUND OF THE INVENTION

Immense and ever-increasing quantities of solid waste are generated each day. Cost of disposal ranks fourth behind schooling, highways, and general municipal expenses. Quantities of daily-accumulated waste in large cities are staggering to the imagination. It has been estimated that each individual in the U.S. generates between 4 and 6 pounds of trash per day. The trash from industrial sources is equivalent to an additional 5 to 10 pounds per person per day. Conventional methods of disposal, such as landfill and mere incineration, have become expensive, create problems of pollution, and represent a loss of values contained in the waste.

Proposals have been made for the processing of solid waste for recovery of the values therein. One feature of many such processes has been to initially shred all of the waste into fine particles which are processed by a plurality of unit operations, to segregate it into its values. The organic materials, to the extent not recovered as paper pulp, have normally been mass burned as a fuel. The problem has been that none of the processes heretofore proposed has been operative on a viable, commercial scale.

I have developed a process which is commercially viable and which is broadly adaptive to changing markets for the values contained in solid waste.

SUMMARY OF THE INVENTION

According to the present invention, solid waste is processed by the steps in combination of feeding the solid waste, in bulk, to a first screening zone, typically, a trommel screen, to obtain a separation of substantially-intact aluminum cans and an organics-rich fraction. Some steel cans are passed through screens with the aluminum cans and are separated therefrom by magnetic separation. A second, finer screening operation is then used to separate the aluminum cans from inorganic fines, such as glass, dirt, rocks, etc. The inorganic fines are passed to landfill. The aluminum-rich stream is then subject to manual sorting, to separate aluminum from combustibles, which comprise plastic, wood, and the like.

The organics-rich fraction may be subjected to manual sorting to separate recyclable fiber products. The remaining materials, which include cloth, wood, small pieces of paper, plastics and the like are recovered and converted, with or without pulping, into an organic fuel by means known in the art. Recyclable fiber products are preferably passed to a bailing operation for cycling to commercial pulpers. If the value of paper pulp is too low, the recyclable fiber products are combined with combustibles for isolation as fuel.

The process of the instant invention operates with a minimum of energy and, since no comminution is employed, aluminum cans and recyclable fiber products are recovered intact. The economic value of the material can then be ascertained—before further processing is undertaken.

DETAILED DESCRIPTION

The present invention is directed to the profitable treatment of municipal solid waste for recovery of values contained therein. As used herein by the term "recyclable fiber products", there is meant cardboard and kraft paper (brown paper products) and newsprint and any other large paper stock which can be readily removed from a moving mass of waste products.

Figure 1:
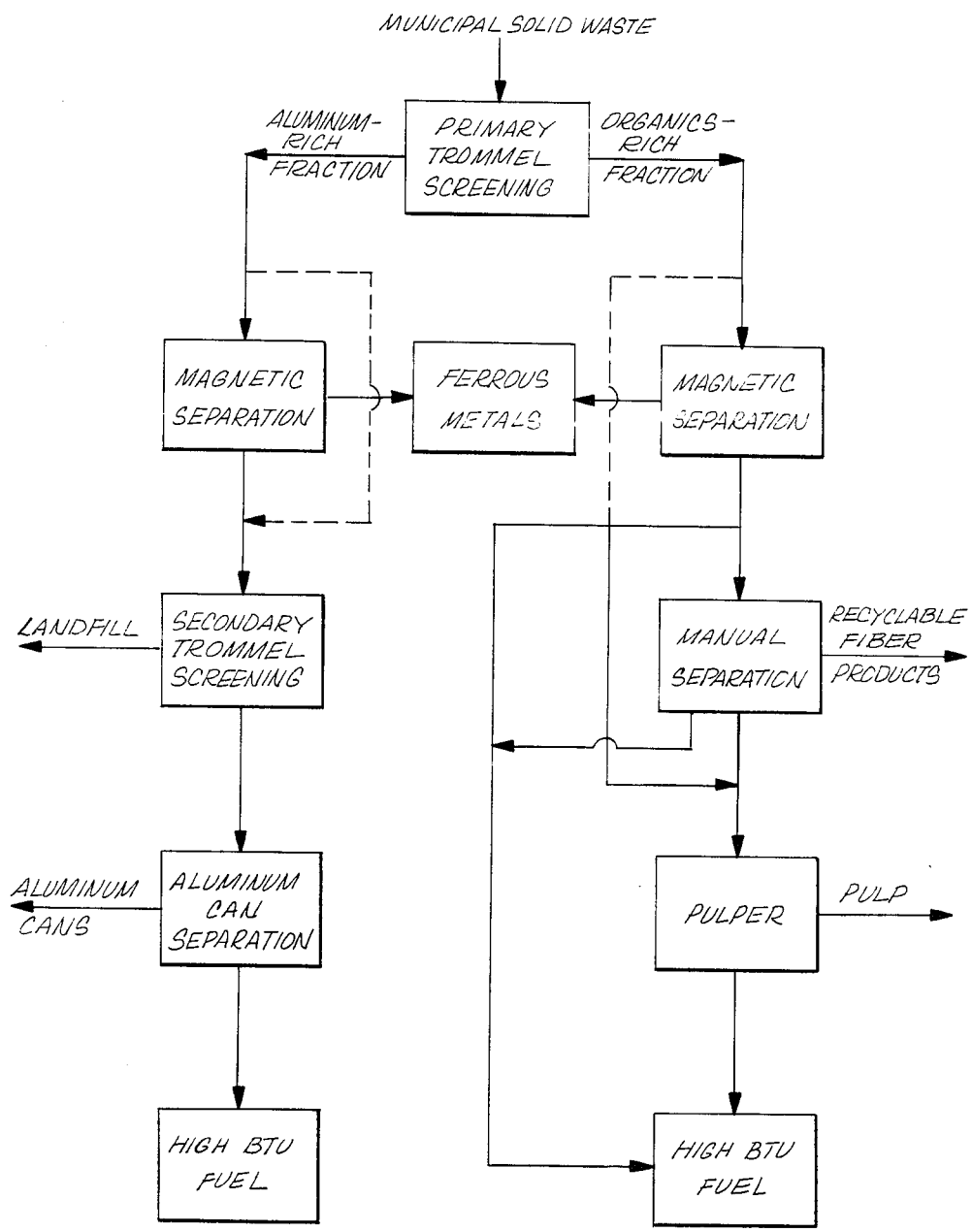
FIG. 1 is a block diagram which illustrates the alternatives available in the practice of this invention.

With reference first to FIG. 1, municipal solid waste is delivered to a primary trommel screen which segregates the waste into an aluminum-rich fraction containing substantially intact aluminum cans and an organics-rich overflow. The separation is based on a screening operation with a trommel screen preferably used. The aluminum-rich fraction may be, and preferably is, first subjected to magnetic separation to remove ferrous materials and passed to a second trommel screening operation where the aluminum cans are separated from an inorganic residue which is passed to landfill. Because combustible organics are mixed with aluminum cans, the aluminum cans are manually separated from the organics which are converted into a high BTU fuel with or without prior pulping to recover paper pulp from the organics.

The overflow from the primary trommel screening operation can be, without further processing, immediately converted into a fuel. Local ordinances for the metals content of fuel may, however, dictate that the materials be subjected to a magnetic separation operation to remove ferrous constituents which are accumulated for recovery as such. This is the presently preferred operation. Except for the ferrous constituents and any aluminum cans which may have eluded separation in the primary trommel, the overflow from the primary trommel screen is substantially free of inorganic materials and, as such, is suitable for isolation as an upgraded fuel source as such or further processing into fuel pellets by means known in the art. The economy may dictate separation of organic constituents into values. As depicted, therefore, the products from magnetic separation passes to a manual separation operation where recyclable fiber products are separated. By virtue of size the order of separation is cardboard and kraft paper, then newsprint. The residue is then, with or without aluminum can separation and/or pulping, utilized as a fuel.

In the practice of the invention the sequence involving a major step of aluminum can recovery is fairly fixed. Processing of the organics is, however, quite flexible and adaptive to changes in the market value of pulp. The system being adaptive to fluctuating conditions enables maximizing economic recovery at minimum energy input.

Figure 2:
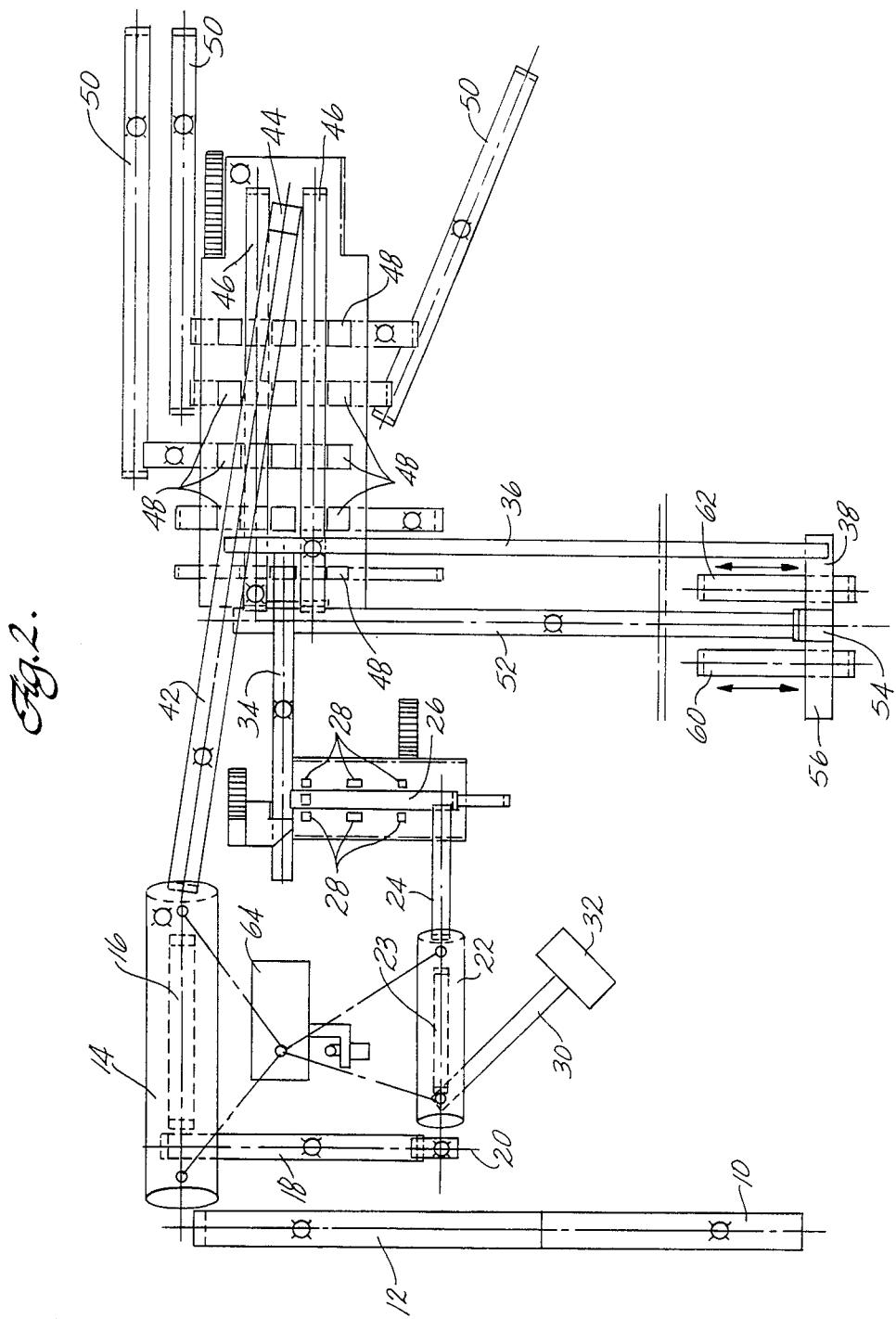
FIG. 2 schematically illustrates the several operations employed in the processing of municipal solid waste in accordance with the preferred practice of the invention.

With reference now to FIG. 2, the waste to be processed is deposited on horizontal feed conveyor 10, which is operable at a variable speed and which cooperates with conveyor belt 12, also operable at a variable speed. Conveyor belt 12 transports and lifts the waste to trommel screen 14. The speeds of the belts are adjusted for an even flow rate of waste to screening trommel screen 14.

In trommel screen 14, the refuse is rotated and tumbled, resulting in breaking of plastic and paper bags to release their contents for separation. The waste is then segregated into a primarily aluminum-rich fraction and a primarily organics-rich fraction. Trommel screen 14 has holes of a size adapted to enable aluminum cans, when on end, to pass through the holes. The holes normally are about 5 inches in diameter. To insure the statistical likelihood that an aluminum can will have an opportunity to fall through the available holes, typically, the solid waste passes through trommel screen 14, nominally about 10 to about 12 feet in diameter and about 50 feet long, and normally rotated at a rate which enables the waste to travel up to approximately 120° and rain down over an area of from 300° to 30°, measured clockwise or counterclockwise, with the 0° location being the vertical at the base of the trommel screen. For a 10 foot diameter trommel screen, rotation is about 10 rpm and for a 12 foot diameter trommel screen rotation is about 12 rpm.

In this manner, at least 90% of the aluminum cans are recovered and transferred to belt 16, along with any organics and inorganics that pass through the holes of the trommel screen. They are, as indicated, conveyed to belt 18 and passed to magnetic separator 20, where ferrous values are separated, and onto trommel screen 22, which contains holes of a smaller size, e.g., about 2.25 inches, to screen out fines from aluminum cans to pass an aluminum-rich fraction to belt 24 and, in turn, to picking belt 26. There, the aluminum cans along with combustible organics are passed by a series of manual separation stations 28. The aluminum cans are separated from the organics, and the combustible residue (organics) is transferred to conveyor belt 34, which transports them to combustibles transport belt 36, where they are conveyed to reversible transfer belt 38, which conveys the combustible residue to reversable and reciprocating conveyor belt 62 for deposit in a truck (not shown) for transport to an operation for conversion of combustibles to an organic fuel.

Alternately, the combustible residue can be converted to a fuel at the site by a process, such as that described in U.S. Pat. No. 4,236,897 to Johnston, incorporated herein by reference or simply used as such as a fuel source. Trommel screen 22, which has a nominal diameter of 8½', and is operated under the same separation conditions as trommel screen 14 when rotated at about 15 rpm. This enables inorganics such as rocks, glass, and the like, to pass through the screen and drop onto conveyor 23, then to pass to conveyor belt 30, which in turn transports them to loader station 32, where the inorganics are collected for transport to landfill.

Material that passes through trommel screen 14 is, except for metals, substantially free of inorganics and is transferred by belt 42 to magnetic separator/splitter 44, where large ferrous materials are separated from organics. The organics at this juncture may be uniformly treated as a fuel, pulped and the rejects treated as a fuel or, as shown, processed for recovery of recyclable fiber products. The residue is treated with or without prior pulping as combustible organics. As shown in FIG. 2, the organics are transferred to one or more manual separator belt(s) 46, operated at a speed of from about 100 to about 350 feet per minute, depending upon the tonnage rate of processing. The number of belts 46 employed, is dependent upon the total tonnage rate.

On the basis of an initial feed of 60 tons per hour to belt 10, with approximately 50 percent separation in trommel screen 14, the yield will be about 30 tons per hour, as shown, to a pair of belts 46 to enable manual separation at a belt speed of from 280 to 290 feet per minute. Cardboard, brown paper and other large paper stock, plastics, and aluminum are deposited into respective chutes 48, and are either collected as such or are combined on belts 50 for passage to a bailer or for truck loading. Aluminum, including cans, and plastics, if collected, are deposited in separate containers. The aluminum recovered is combined with the aluminum cans for recycle.

The recyclable fiber products of the waste may then be processed for recycle, depending upon the marketplace, as paper pulp and the like. Typically, the bulk fiber products are bailed for transport to paper mills or processed on site. Otherwise, they are combined, in whole or in part, with the combustibles to be transformed into fuel. To this end, a belt system can be added to transfer them to belt 36 to the loading operation for fuel conversion, or passed to some other operation (not shown) for direct combustion or conversion to a solid fuel.

Alternately, or in combination with the above operation, the residuals, which include high fiber materials, such as office paper and the like, wood, and valueless plastics, are allowed to remain on belt 46 and are transferred to belt 52 for transport to divider belts 38 and 56, where they are collectively transferred by splitter 54 to reversible and reciprocating belt loaders 60 and 62, to fill trucks destined for pulping operations. The rejects of pulping are used as fuel.

Dust collected in the operation is passed to baghouse 64 from various sources, as indicated in the drawing, for removal of dust before venting gases to the atmosphere. Collected dust is passed to landfill.

In the process of the instant invention, there is a separation of values contained in waste, into aluminum cans for recycle by the most convenient means; recyclable fiber product for recycle or passage to fuel conversion, residual organics for passage to fuel conversion, with or without pulping, and inorganics for passage to landfill at the minimum of energy input at the sites of solid-waste separation.

The recovered materials can then be stored and processed as the economy dictates, to maximize their value at the end of the process, with minimization of cost in formation of the segregated segments at the time of waste processing. In the operation of the process of the invention, the combustibles are upgraded by inorganic separation from about 5,000 BTU/lb. up to 9,000 or 10,000 BTU/lb.

A control system is used to control the various refuse-processing lines in a safe, reliable manner. Equipment is put into operation manually by the operator. A suitable interlocking is provided for safety of personnel and equipment.

The operator starts the system and monitors its operation from the control console (not shown). A sequential start-up procedure is required. This includes a start button for each piece of equipment located on the control console. Interlocks are provided to ensure that any piece of equipment cannot be operated without an entire downstream system in operation and ready to receive material. The control system in conjunction with external deviecs or interlocks, provides maximum safety to prevent or minimize control action from creating an unsafe condition upon component malfunction. Systems configurations and related equipment application details are selected, taking full cognizance of the principle of safe operation at all levels in the system.

"Safe operation" is defined to mean that loss of signal, loss of excitation, or failure or abnormal operation of any component, will not permit nor produce the development of occurrence of a hazardous condition. The following types of failure are analyzed for possible consequences in determining the appropriate details of design, with due consideration given redundancy features in selecting control-system design features: (a) failure of sensors; (b) loss of input signal; and (c) loss of motive power to final-control elements. System design takes into account the duty-cycle requirements of the final-drive elements. To this end, the output controller and final drive are fully compatible, and are designed for continuous operation.

What is claimed is:

1. A process for a separation of solid waste into recoverable segments, which comprises:
   (a) screening the solid waste in a first screening zone to form:
      (i) an aluminum-rich underflow comprising substantially-intact aluminum cans, inorganic fines, and combustible organics, and
      (ii) an organics-rich overflow comprising recyclable fiber products;
   (b) separating the substantially intact aluminum cans from the inorganic fines contained in the aluminum-rich underflow by a second screening operation;
   (c) manually separating the substantially-intact aluminum cans from combustible organics; and
   (d) isolating at least a portion of the organics-rich overflow for use as a fuel.

2. A process as claimed in claim 1 in which ferrous materials are magnetically separated from the aluminum-rich overflow and the organics-rich overflow, prior to separation of the substantially-intact aluminum cans from inorganic fines and isolation of at least a portion of the organics-rich overflow for use as a fuel.

3. A process as claimed in claim 1 in which the substantially-intact aluminum cans are separated from the solid waste in a first trommel screen and in which the substantially-intact aluminum cans are separated from an underflow of inorganic fines in a second trommel screen.

4. A process as claimed in claim 2 in which the substantially-intact aluminum cans are separated from the solid waste in a first trommel screening operation and in which the substantially-intact aluminum cans are separated from an underflow of inorganic fines in a second trommel screening operation.

5. A process as claimed in claim 1 in which organics-rich overflow is subjected to a pulping operation with rejects of the pulping operation isolated as fuel.

6. A process as claimed in claim 1 in which recyclable fiber products are manually separated from the organics-rich overflow and to leave an organic residue, at least a portion of which is isolated for use as a fuel.

7. A process as claimed in claim 6 in which the organic residue is subjected to pulping and rejects of the pulping are isolated for use as a fuel.

8. A process as claimed in claim 4 in which organics-rich overflow is subjected to a pulping operation with rejects of the pulping operation isolated as fuel.

9. A process as claimed in claim 4 in which recyclable fiber products are manually separated from the organics-rich overflow to leave an organic residue at least a portion of which is isolated for use as a fuel.

10. A process as claimed in claim 9 in which the residue is subjected to pulping to form paper pulp and rejects of the pulping are isolated for use as a fuel.

11. A process as claimed in claim 1 in which the recyclable fiber products are converted to pulp.

12. A process as claimed in claim 10 in which the recyclable fiber products are converted to pulp.

13. A process for the recovery of values from solid waste, which comprises:
   (a) feeding as-collected solid waste to an inlet of a first trommel screen containing openings sufficiently large to pass on end, substantially-intact aluminum cans no separating by rotation of said trommel screen, an aluminum-can-rich fraction comprising at least about 90 percent of the substantially-intact aluminum cans and inorganics, including ferrous materials, from said solid waste, and discharging as overflow from the trommel screen an organics-rich fraction comprising ferrous materials, recyclable fiber products, plastics, and wood;
   (b) magnetically separating the ferrous materials from the aluminum-rich fraction, to leave an aluminum-can residue-fraction;
   (c) passing the aluminum-can residue-fraction to a second trommel screen having openings of a size insufficient to pass aluminum cans, and separating a fraction comprising aluminum cans and a first combustible organics fraction from an inorganics fraction which passes through openings of the second trommel screen;
   (d) discarding the inorganics fraction as landfill;
   (e) manually separating the aluminum cans from the first combustible organics fraction;
   (f) magnetically separating ferrous materials from the organics-rich fraction, to leave an organics-rich residue; and
   (g) passing the organics-rich residue to manual picking stations and separating at least recyclable fiber product comprising cardboard, brown paper and newsprint from the organics-rich residue, leaving a second combustible organics fraction.

14. A process as claimed in claim 13 in which at least a portion of a second combustible organics fraction is pulped and rejects isolated as fuel.

15. A process as claimed in claim 13 in which the recyclable fiber products are converted to pulp.

16. A process as claimed in claim 15 in which a first combustible organics fraction is combined with the second combustible organics fraction and converted to pulp and rejects isolated as a fuel.

17. A process as claimed in claim 13 in which the first combustible organics fraction and second combustible organics fraction are isolated for use as a fuel.

* * * * *

UNITED STATES PATENT AND TRADEMARK OFFICE
CERTIFICATE OF CORRECTION

PATENT NO. : 4,553,977

DATED : November 19, 1985

INVENTOR(S) : Thomas H. Fry

It is certified that error appears in the above-identified patent and that said Letters Patent is hereby corrected as shown below:

Column 5, line 36, claim 2, "aluminum-rich overflow" should read -- aluminum-rich underflow --.

Column 6, line 20, claim 13, "cans no separating" should read -- cans and separating --.

Signed and Sealed this

Twenty-third Day of December, 1986

*Attest:*

DONALD J. QUIGG

*Attesting Officer*   *Commissioner of Patents and Trademarks*